United States Patent [19]

Wu

[11] Patent Number: 4,480,051

[45] Date of Patent: Oct. 30, 1984

[54] ACTIVATED IRON HYDROGENATION CATALYST

[75] Inventor: James C. Wu, Beaumont, Tex.

[73] Assignee: E. I. Du Pont de Nemours and Company, Wilmington, Del.

[21] Appl. No.: 519,991

[22] Filed: Aug. 3, 1983

[51] Int. Cl.$^3$ .............................................. B01J 23/74
[52] U.S. Cl. .................................... 502/338; 564/492
[58] Field of Search ......................... 502/338; 564/492

[56] References Cited

U.S. PATENT DOCUMENTS

| | | | |
|---|---|---|---|
| 3,696,153 | 10/1972 | Kershaw et al. | 564/492 |
| 3,758,584 | 9/1973 | Bivens et al. | 564/492 |
| 3,986,985 | 10/1976 | Dewdney et al. | 502/338 |
| 4,064,172 | 12/1977 | Dewdney et al. | 564/492 |

Primary Examiner—W. J. Shine

[57] ABSTRACT

Process for improving the activity of an iron oxide hydrogenation catalyst by reducing the catalyst; oxidizing the reduced catalyst and then re-reducing the catalyst.

4 Claims, No Drawings

ACTIVATED IRON HYDROGENATION CATALYST,

BACKGROUND OF THE INVENTION

1. Field of the Invention

The present invention is directed to an improved process for the activation of iron containing catalysts and, more particularly, to the activation of iron catalysts which are especially adapted to the hydrogenation of adiponitrile to hexamethylenediamine.

2. Description of the Prior Art

The catalysts to which the process of the present invention is applied are described throughout the art and particularly in U.S. Pat. No. 3,696,153 issued on Oct. 3, 1972 which patent discloses the hydrogenation of adiponitrile at elevated temperatures and pressures in the presence of a catalyst derived from an iron compound, e.g., iron oxide, in granular which catalyst has been activated with hydrogen at a temperature not exceeding about 600° C. An improved process for activating the iron oxide hydrogenation catalyst for use in a similar reaction by employing a mixture of hydrogen and ammonia for activation at a temperature in the range of about 300°–600° C. is disclosed in U.S. Pat. No. 3,758,584 issued on Sept. 11, 1973.

The use of a fused and solidified iron oxide catalyst containing at least 96.5% iron oxide and having an atomic ratio of oxygen to iron of 1.2:1–1.4:1 for the hydrogenation of adiponitrile to hexamethylenediamine is disclosed in U.S. Pat. No. 4,064,172 issued on Dec. 20, 1977.

U.S. Pat. No. 3,986,985 issued on Oct. 19, 1976 discloses a technique for stabilizing an iron containing catalyst to render it nonpyrophoric which technique involves treating the catalyst with a gas having a low oxygen content, e.g., air diluted with nitrogen. This treatment is taught to produce a surface coating which is stable and nonpyrophoric and thus a catalyst which is stable. The patentees disclose that the catalyst activity may be restored by a short treatment with hydrogen.

SUMMARY OF THE INVENTION

The present invention is a process for improving the activity of an iron hydrogenation catalyst, e.g., a catalyst which is especially adapted to the hydrogenation of adiponitrile to hexamethylenediamine which improved process comprises contacting an iron compound, e.g., iron oxide with a reducing gas comprising hydrogen at a temperature not exceeding about 600° C. until the iron is sufficiently reduced to produce an active hydrogenation catalyst and thereafter contacting the thus activated catalyst with a gas having an oxygen content of at least 10.5% to permit a pyrophoric reaction and oxidation of the iron to occur and thereafter reactivating the hydrogenation catalyst by repeating the reduction. Air is the preferred oxygen containing gas and a mixture of hydrogen and ammonia is the preferred reducing gas.

DETAILED DESCRIPTION OF THE INVENTION

The iron catalyst to which the process of the present invention is applied is well known to those skilled in the art and is described in detail in the patents discussed above in the Description of the Prior Art. The disclosures of which are incorporated herein by this reference. More particularly, the iron oxide catalyst is in granular form and is predominately iron oxide although minor amounts of alumina, silica, calcium oxide and the like which are found in relatively pure iron ores can be tolerated. Except for silica, usually impurities are present at a level less than about 3% by weight based upon the weight of the catalyst. Relatively pure iron oxide in granular form is the preferred starting material. The catalyst may be activated according to any one of the techniques set forth in the above discussed art but usually is activated by a hydrogen containing gas having from 0.001–10 and preferably 0.25–0.3% by volume of the ammonia therein at a hydrogen pressure maintained during activation in the range 0.007–68 and preferably 0.1–10 atmospheres. The activation temperature is in the range 300–600 and preferably 350–420° C. The activation is usually continued until the oxide content of the iron compound has decreased to less than 19% by weight. Hydrogen can be supplied to the catalyst at a rate in the range of about 125–3430 and preferably 312–940 cc/hr/gm of oxide.

In order to realize the benefits of the present invention the activated catalyst must be thoroughly contacted with oxygen or a gaseous mixture containing at least 10.5 and preferably at least about 21% oxygen (air), although it is within purview the oxygen can be used to increase the oxygen content of the gas and although essentially 100% oxygen can be employed, it is not preferred from a standpoint of economics.

The method for contacting the oxygen containing gas with the catalyst is not critical to the present invention so long as intimate contact is provided. Such contact can be obtained by exposing the reduced catalyst to atmospheric air in a stirred vessel, by pouring the reduced catalyst from one open vessel to another through air, or by blowing air through the catalyst, etc. It is preferred to contact the oxygen and catalyst in a uniform manner so that the catalyst will not overheat in one location, i.e., develop hot spots, and thereby fuse. Generally, it is preferred to contact the catalyst and oxygen in such a manner that the temperature of the gases leaving the surface of the catalyst does not exceed 1535° C. and preferably is maintained in the range 350–500° C.

The following Examples are presented to illustrate but not to restrict the present invention. Parts and percentages are by weight unless otherwise specified.

The basic catalyst employed in the Examples was prepared by charging approximately 150 grams of 200–400 mesh iron oxide having the composition shown in the table, to a stainless steel tube of 2.54 cm ID and approximately 50.8 cm in length.

TABLE

| Component | Weight Percent (Dry Basis) |
| --- | --- |
| Fe$_2$O$_3$ | 93.4 |
| FeO | 0.70 |
| SiO$_2$ | 5.0 |
| Fe° | |
| Al$_2$O$_3$ | |
| CaO | |
| MgO | |
| MnO | 1.6 |
| Na$_2$O | |
| K$_2$O | |
| Li$_2$O | |
| TiO$_2$ | |

A gas stream containing approximately 99% hydrogen and 1% ammonia by volume was introduced through the iron oxide at a flow rate of approximately 2,000 cc/min. while the temperature of the catalyst was maintained at 460° C. The reduction was continued for 22 hours following which time the catalyst was deemed to be essentially reduced as judged by the total water collected in the off-gas and the weight losses of iron oxide. The reduced catalyst was pyrophoric when exposed to air. Approximately a 20 gram portion of the catalyst prepared as set forth above was charged to a 1 liter stirred autoclave along with 216 grams of adiponitrile and 216 grams of ammonia. The contents of the autoclave were heated to 150° C. and a pressure of 5,000 psig maintained by introducing hydrogen to the autoclave. The reaction rate was observed to be 3.3 grams of adiponitrile/gram of catalyst/hour.

Example I

Approximately 200 grams of the 8-20 mesh portion of the catalyst, reduced as above, was exposed to air in a crucible and stirred to insure thorough contact of the air with the catalyst and the catalyst was poured from one crucible to another crucible to avoid fusing. During the contact of the catalyst with air a large amount of heat was released. After the evolution of heat ceased, the reoxidized catalyst was then ground and screened to recover a 200-400 mesh portion which was then reduced using the above described procedure for the initial catalyst. The portion of the oxidized re-reduced catalyst was tested in the above described hydrogenation unit under the same conditions and the reaction rate was observed to be 4.8 grams of ADN/gram of catalyst/hour. Another portion of the oxidized then re-reduced catalyst was tested in the above described hydrogenation unit under the same conditions except that the reaction temperature was reduced to 140° C. The reaction rate was observed to be 3.8 grams of ADN/gram of catalyst/hour.

I claim:

1. A process for the preparation of a hydrogenation catalyst which comprises (a) contacting an iron containing compound with a reducing gas comprising hydrogen at a temperature not exceeding about 600° C. until the iron is sufficiently reduced to produce an active hydrogenation catalyst (b) contacting the thus activated catalyst with a gas having an oxygen content of at least 10.5% to permit a pyrophoric reaction of the iron to occur and thereafter repeating step (a).

2. The process of claim 1 wherein the oxygen containing gas is air.

3. The process of claim 1 wherein the reducing gas comprises hydrogen and ammonia.

4. A method for increasing the activity of a catalyst especially adapted to the hydrogenation of adiponitrile to hexamethylenediamine which catalyst is initially prepared by contacting an iron containing compound with a reducing gas comprising hydrogen at a temperature not exceeding about 600° C. until the iron compound is sufficiently reduced to form an active hydrogenation catalyst, thoroughly contacting the active catalyst with a gas containing at least 10.5% molecular oxygen to produce a pyrophoric reaction of the iron and thereafter re-reducing the iron compound at a temperature not exceeding about 600° C.

* * * * *